United States Patent
Nishioka

(10) Patent No.: US 8,116,228 B2
(45) Date of Patent: Feb. 14, 2012

(54) NETWORK PATH CONTROL SYSTEM, PATH CONTROL DEVICE, AND PATH CONTROL METHOD

(75) Inventor: Itaru Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 348 days.

(21) Appl. No.: 12/000,993

(22) Filed: Dec. 19, 2007

(65) Prior Publication Data

US 2008/0151755 A1 Jun. 26, 2008

(30) Foreign Application Priority Data

Dec. 22, 2006 (JP) ................. 2006-345842

(51) Int. Cl.
*H04L 12/28* (2006.01)
*H04L 12/26* (2006.01)
*G06F 7/02* (2006.01)

(52) U.S. Cl. ........ 370/254; 370/252; 370/351; 370/401; 707/E17.005

(58) Field of Classification Search .................. 370/235, 370/229–230, 254, 252, 216, 255, 351, 352, 370/401; 707/200, E17.005, 999.2; 709/223, 709/229, 244
See application file for complete search history.

(56) References Cited

U.S. PATENT DOCUMENTS

| | | | | |
|---|---|---|---|---|
| 5,970,502 | A * | 10/1999 | Salkewicz et al. ................. | 1/1 |
| 6,400,681 | B1 * | 6/2002 | Bertin et al. .................. | 370/218 |
| 6,438,563 | B1 * | 8/2002 | Kawagoe .............................. | 1/1 |
| 6,628,670 | B1 * | 9/2003 | Galand et al. ................. | 370/468 |
| 6,810,032 | B2 * | 10/2004 | Kano et al. .................... | 370/351 |
| 7,382,765 | B2 * | 6/2008 | Kennedy et al. ............... | 370/351 |
| 7,450,513 | B2 * | 11/2008 | Okamura et al. .............. | 370/235 |
| 7,558,215 | B2 * | 7/2009 | Rajan ............................. | 370/254 |
| 7,593,321 | B2 * | 9/2009 | Galand et al. ................. | 370/218 |
| 7,606,175 | B1 * | 10/2009 | Maufer ......................... | 370/255 |
| 7,742,432 | B2 * | 6/2010 | Dominick et al. ............. | 370/254 |
| 7,835,301 | B1 * | 11/2010 | Maufer ......................... | 370/254 |
| 2003/0135645 | A1 * | 7/2003 | Oki et al. ...................... | 709/238 |
| 2003/0193901 | A1 * | 10/2003 | Ishibashi ....................... | 370/252 |
| 2004/0190457 | A1 * | 9/2004 | Mohr ............................ | 370/241 |
| 2005/0188073 | A1 * | 8/2005 | Nakamichi et al. ........... | 709/223 |
| 2005/0232263 | A1 * | 10/2005 | Sagara .......................... | 370/389 |

(Continued)

FOREIGN PATENT DOCUMENTS

JP 2002-354012 12/2002

(Continued)

OTHER PUBLICATIONS

A. Farrel et al., "Request for Comments (RFC)" 4655, IETF Network Working Group, Aug. 2006, Section 5.2, Section 6.7 (1).

*Primary Examiner* — Kwang B Yao
*Assistant Examiner* — Candal Elpenord
(74) *Attorney, Agent, or Firm* — Foley & Lardner LLP

(57) ABSTRACT

A path control device includes a TE database and a local database for storing topology information showing states of use of links in a network, a topology information collection unit collecting the topology information of the respective communication nodes therefrom and updating the TE database by the topology information, a path solution unit determining a path of the network referring to the local database, an internal update unit recognizing a link included in the determined path and updating a local database by information as to said link, and an update determination unit matching the topology information of both the databases by comparing both the databases.

17 Claims, 11 Drawing Sheets

U.S. PATENT DOCUMENTS

| | | | |
|---|---|---|---|
| 2006/0067247 A1* | 3/2006 | Rajan | 370/254 |
| 2006/0092940 A1 | 5/2006 | Ansari et al. | |
| 2007/0047465 A1* | 3/2007 | Kano | 370/254 |
| 2007/0230346 A1* | 10/2007 | Yamada et al. | 370/235 |

FOREIGN PATENT DOCUMENTS

| | | |
|---|---|---|
| JP | 2006-135975 | 5/2006 |
| JP | 2006-141007 | 6/2006 |
| JP | 2006-324902 | 11/2006 |

* cited by examiner

FIG. 3

260: Local DB

410: MAIN TOPOLOGY INFORMATION TABLE

| LINK ID | LINK BAND | REMAINING BAND | |
|---|---|---|---|
| a | 10 Gbps | 0 Gbps | ※ |
| b | 10 Gbps | 10 Gbps | |
| c | 10 Gbps | 0 Gbps | |
| d | 10 Gbps | 0 Gbps | ※ |
| e | 10 Gbps | 10 Gbps | |
| f | 10 Gbps | 0 Gbps | ※ |
| g | 10 Gbps | 10 Gbps | |

(※ PREVIOUS CACHE)

420: TABLE BEFORE UPDATE

| LINK ID | REMAINING BAND | AGE |
|---|---|---|
| a | 10 Gbps | 10 sec |
| d | 10 Gbps | 10 sec |
| f | 100 Gbps | 10 sec |

250: TEDB

430: TOPOLOGY INFORMATION TABLE

| LINK ID | LINK BAND | REMAINING BAND |
|---------|-----------|----------------|
| a | 10 Gbps | 10 Gbps |
| b | 10 Gbps | 10 Gbps |
| c | 10 Gbps | 0 Gbps |
| d | 10 Gbps | 10 Gbps |
| e | 10 Gbps | 10 Gbps |
| f | 10 Gbps | 10 Gbps |
| g | 10 Gbps | 10 Gbps |

FIG. 4

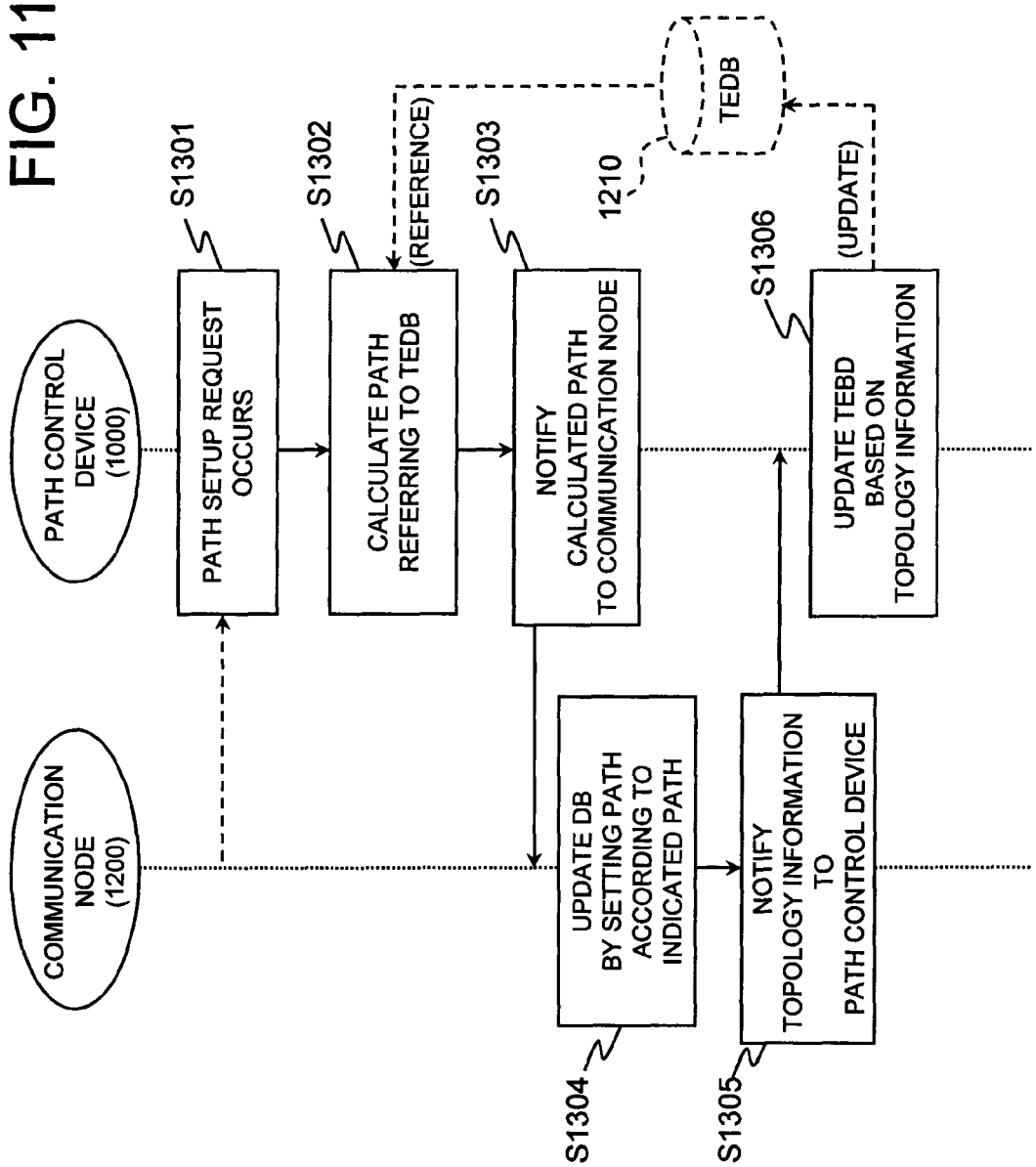

NETWORK PATH CONTROL SYSTEM, PATH CONTROL DEVICE, AND PATH CONTROL METHOD

This application is based upon and claims the benefit of priority from Japanese patent application No. 2006-345842, filed on Dec. 22, 2006, the disclosure of which is incorporated herein in its entirety by reference.

FIELD OF THE INVENTION

The present invention relates to a path control technology of a network for switching traffics in the unit of a path, and more particularly, to a technology for synchronizing the control information of paths in a large-scale network in which a path control function is logically separated from a transfer function.

DESCRIPTION OF THE RELATED ART

An arrangement of a network control system relating to the present invention is disclosed in, for example, A. Farrel et al., Request for Comments (RFC) 4655, IETF Network Working Group, August 2006, section 5.2, section 6.7 (1). Further, a technology to which the arrangement disclosed in the document is applied, is disclosed in, for example, a patent document 1, i.e. Japanese Patent Application Laid-Open No. 2006-135975 (FIGS. 4, 5, 13).

FIG. 10 shows a system arrangement disclosed in section 5.2 of the A. Farrel et al., Request for Comments (RFC) 4655, IETF Network Working Group, August 2006, section 5.2, section 6.7 1). A system 1001 includes a plurality of communication nodes 1200 and a path control device 1000 disposed at a location spaced apart from the communication nodes 1200. Each of the communication nodes 1200 includes a node controller 1210, a database 1220 for holding the information thereof, and a transfer function 1230. The path control device 1000 is composed of a path solution unit 1010 for determining a path, and a TE database (TEDB: Traffic Engineering Database) 1020 for storing the topology information as link information collected from the respective communication nodes 1200 through a communication line 1100.

FIG. 11 shows an operation according to the above arrangement. When the path control device 1000 receives a request for setting a path from a communication node 1200 and the event of the request occurs (S1301), the path control device 1000 determines a path referring to the TE database 1020 (S1302). Then, the path control device 1000 transmits the information of the determined path to the communication node 1200 through the communication line 1100 (S1303).

On receiving the path information, the communication node 1200 sets a path from the node thereof according to the path information using a signaling protocol such as RSVP-TE (Resource Reservation Protocol with Traffic Engineering) and the like, and then updates the DB 1220 thereof (S1304). On the completion of the update, the topology information, which shows the updated link information, are notified to the path control device 1000 (S1305). As disclosed in section 6.7 1 of A. Farrel et al., Request for Comments (RFC) 4655, IETF Network Working Group, August 2006, section 5.2, section 6.7 1), a notification means can make use of a routing protocol such as OSPF-TE (Open Shortest Path First with Traffic Engineering) and the like. The path control device 1000 updates the TE database 1020 based on the received topology information (S1306) and shifts to a state in which it waits for a request for setting a new path. The TE database 1020 of the path control device 1000 is updated sequentially by the above procedure.

In Japanese Patent Application Laid-Open No. 2006-135975, communication nodes having the above transfer function in A. Farrel et al., Request for Comments (RFC) 4655, IETF Network Working Group, August 2006, section 5.2, section 6.7 1) and a controller having control function are arranged as different devices, respectively (FIGS. 4 and 5). Further, FIG. 13 of Japanese Patent Application Laid-Open No. 2006-135975 shows a control performance achieved by the arrangement. It can be found from the graph of the drawing that as the number of the nodes of the network increases as well as the number of hops of the controller and a transfer path increase, the update of topology information is more delayed with a result that a convergence time increases.

However, the above network system has the following problems. As presumed from FIG. 13 of Japanese Patent Application Laid-Open No. 2006-135975, a first problem resides in that it takes a time until the topology information held by the path control device are matched to the information recognized by a communication node as to actual network state depending on the size of a network and the disposition of the path control device. This is because a delay occurs according to the distance and the communication band between both the devices while the path control device receives the topology information from a node device. Further, when a routing protocol is used to update the topology information, the above problem becomes more serious because a delay due to the protocol is added.

A second problem resides in that it is difficult for the path control device to calculate a reliable path in a large-scale network. This is because the topology information, which is used for path calculation, is unlike to agree with an actual network state due to the delay of update of the topology information described above. Therefore, there is a possibility that a path calculated by the path control device may not be applied to the actual network state.

Accordingly, an object of the present invention is to provide a technology capable of determining a path by more accurate topology information even in a large-scale network.

SUMMARY OF THE INVENTION

A network path control system according to the present invention includes a plurality of communication nodes connected by links of a network and a path control device having a first database and a second database for storing topology information showing states of use of the links in the network, wherein the path control device comprises: a topology information collection unit collecting the topology information of the respective communication nodes therefrom and updating the first database by the collected topology information; a path solution unit determining a path of the network referring to the second database; an internal update unit recognizing a link included in the determined path and updating the second database by information as to said link; and an update determination unit matching the topology information of both the first and second databases by comparing the first and second databases.

According to the present invention, when the path control device determines a path of the network, it is possible to prevent the path control device from being influenced by the delay of the topology information from a communication node. Further, a path can be calculated based on the topology information to which an actual network state is reflected. This is because the topology information, which are used when the path is determined, is stored separately from the topology information from a communication node as well as both the topology information are controlled so that they are matched to each other. With this arrangement, a reliable path can be set at all times regardless a network size.

BRIEF DESCRIPTION OF THE DRAWINGS

FIG. 3 is an explanatory view of a local database of the first embodiment;

FIG. 4 is an explanatory view of a TE database of the first embodiment;

FIG. 11 is a flowchart showing an operation in the arrangement of FIG. 10.

DESCRIPTION OF THE PREFERRED EMBODIMENTS

Figure 1:
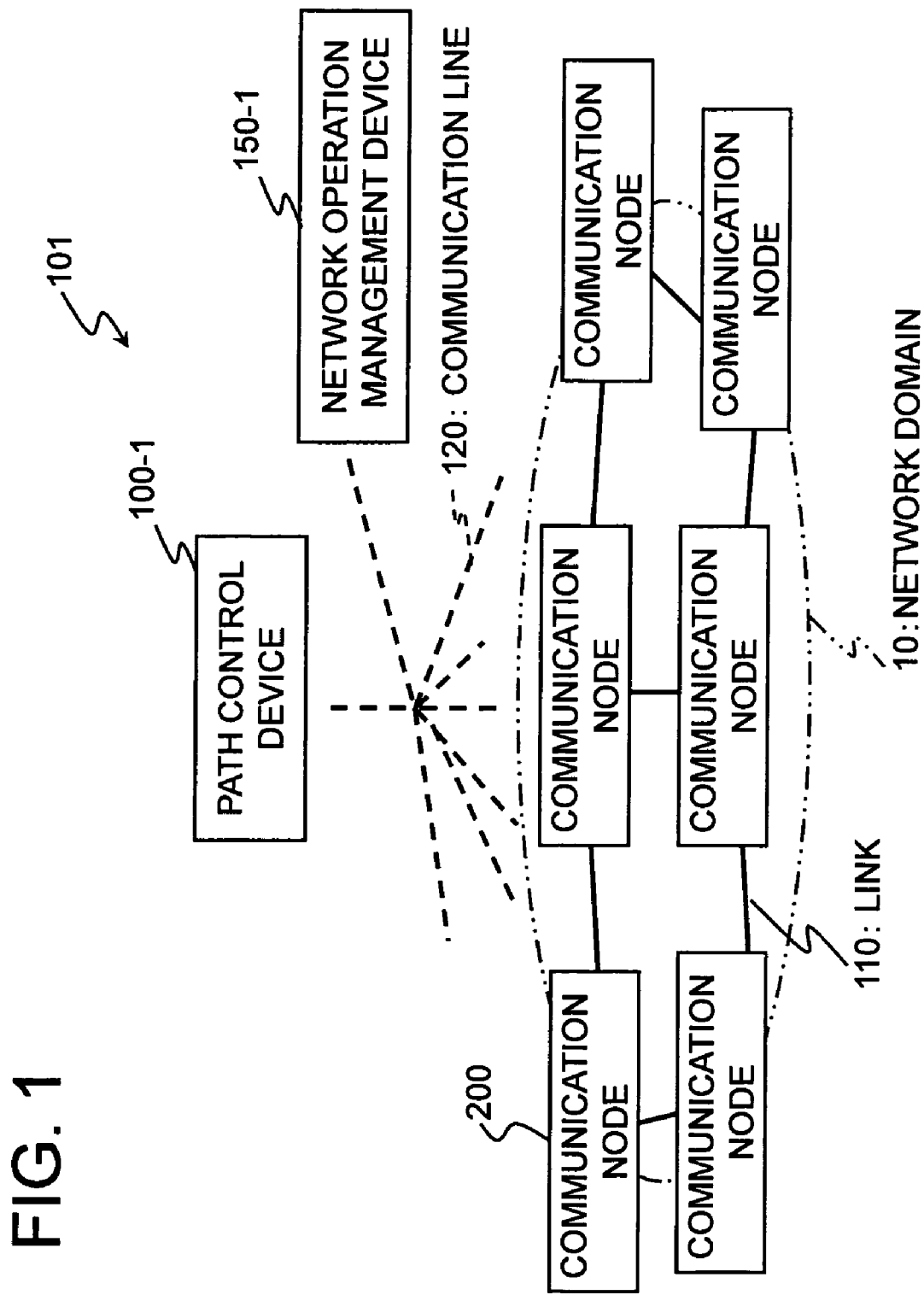
FIG. 1 is a block diagram showing a single domain network arrangement according to a first embodiment of the present invention.

FIG. 1 shows a system arrangement of the first embodiment of the present invention. A system 101 of the embodiment includes a path control device 100-1, a network operation management device 150-1, and a network domain 10. The system 101 is arranged as a single domain network. The domain means a set of one or a plurality of communication nodes. Exemplified as the domain is, an "area" defined by OSPF (Open Shortest Path First) as a kind of routing protocol, AS (Autonomous System) defined by BOP (Border Gateway Protocol) and the like.

The network domain 10 includes a plurality of communication nodes 200 connected by links 110. The network operation management device 150-1 manages the path of the network domain 10 and the arrangement of the network. In the system 101, all the communication nodes 200, the path control device 100-1 and the network operation management device 150-1 can exchange control management information such as topology information, path setup information and the like through a communication line 120.

The communication nodes 200 are, for example, WDM (Wavelength Division Multiplexing) transmission device, OXC (Optical Cross-connect) device, TDM (Time Division Multiplexing Cross-connect) device, MPLS (Multi-protocol Label Switching) router, IP router, Ethernet switch, and the like. Each of the communication nodes 200 can set a path as a traffic path by the exchange technology thereof.

Figure 2:
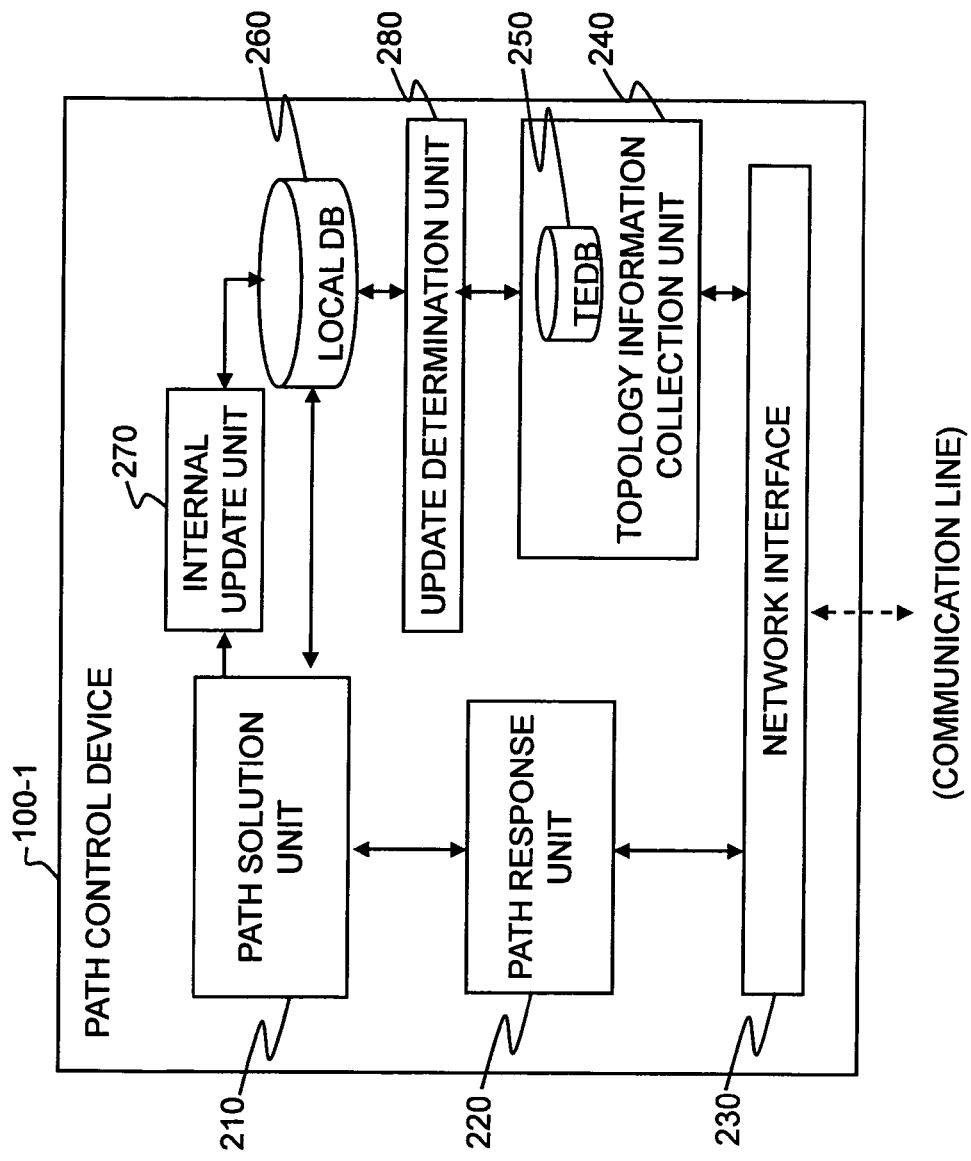
FIG. 2 is a block diagram showing an arrangement of a path control device of the first embodiment.

FIG. 2 shows an arrangement of the path control device 100-1. The path control device 100-1 is composed of a path solution unit 210, a path response unit 220, a topology information collection unit 240, a TE database (TEDB) 250 of the topology information collection unit 240, a local database 260, a network interface 230, an internal update unit 270, and an update determination unit 280. The TE database 250 corresponds to, a first database in the present invention and holds information by a volatile memory device. The local database 260 corresponds to a second database in the present invention and holds information by a non-volatile memory device. The other components are functions realized by a computer program.

The path response unit 220 analyzes requests received from the communication nodes 200 and the network operation management device 150-1 as to a path calculation, requests a path calculation to the path solution unit 210 and further sends a response of the path information calculated by the path solution unit 210 to the request sources. PCEP (PCE Communication Protocol), for example, can be used as a protocol for accepting the path calculation request and the response.

When the path solution unit 210 is requested the path calculation from the response unit 220, it calculates the path from a start communication node to a terminate communication node referring to the local database 260. Further, the path solution unit 210 notifies the path response unit 220 and the internal update unit 270 of a result of calculation of the path. The path solution unit 210 can uses CSPF (Constraint Shortest Path First) for calculating a path in consideration of the restricting conditions of a requested path as a path calculation algorithm used by the path solution unit 210.

The topology information collection unit 240 collects latest topology information showing a state of use of the links from the respective communication nodes 200, reflects it to the TE database 250, and further notifies the update determination unit 280 that it is reflected. As a specific method of collecting the topology information, there is a method of collecting all the topology information from a part of the communication nodes 200 by, for example, protocols such as OSPF, IS-IS (Intermediate System to Intermediate System), BGP, and the like. Otherwise, a method of collecting a part of the topology information from all the communication nodes 200 and coupling them by SNMP (Simple Network Management Protocol) and the like may be also employed.

The internal update unit 270 recognizes the information of a link forming the path from the path information calculated by the path solution unit 210 and updates the local database 260 as to the recognized link.

The update determination unit 280 compares the information of the local database 260 with that of the TE database 250 to match these databases to each other. When the respective information does not correspond to each other as a result of comparison, the information of the TE database 250 is overwritten to the local database 260.

Figure 10:
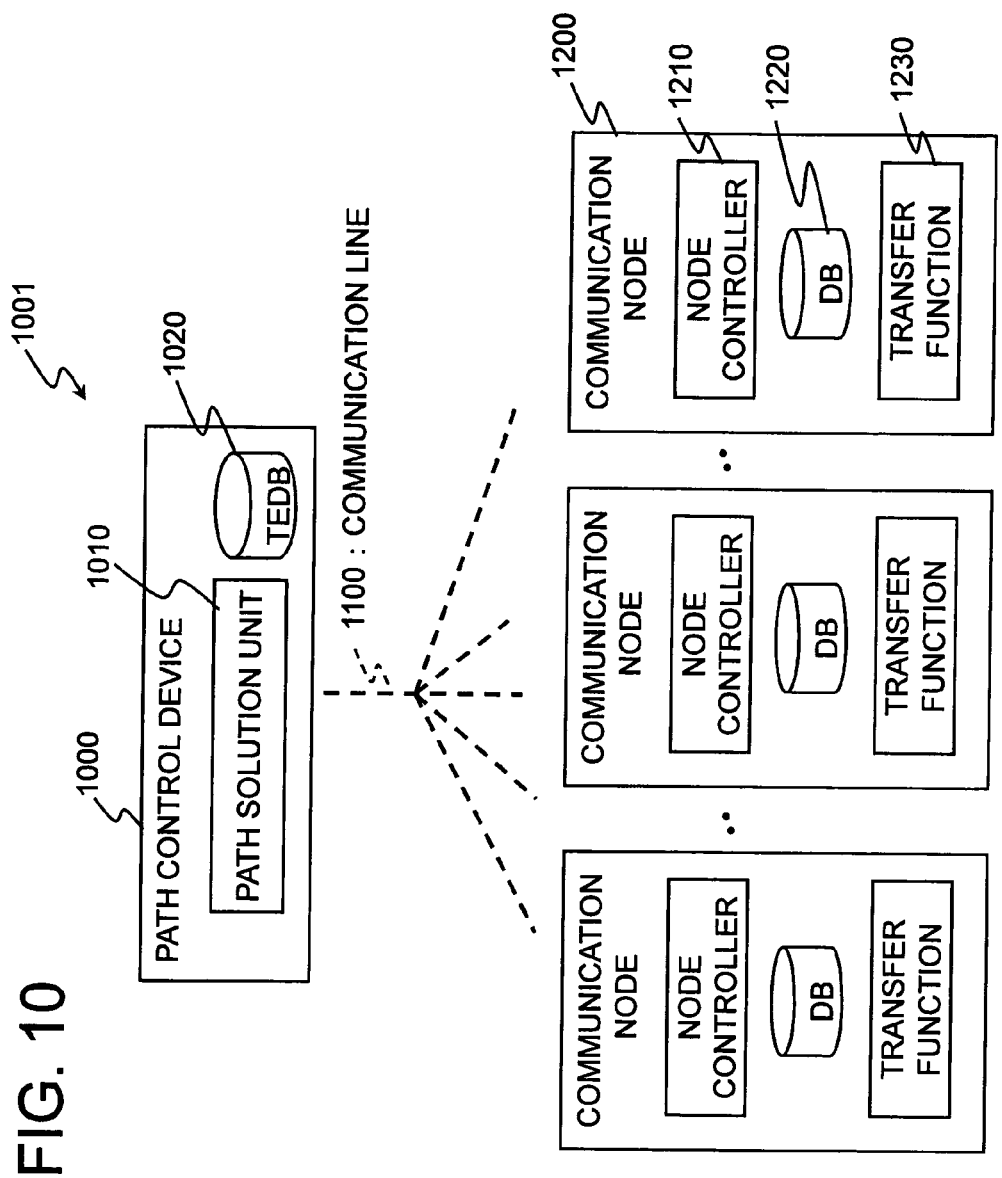
FIG. 10 is a block diagram schematically showing an arrangement of a network control system of A. Farrel et al., Request for Comments (RFC) 4655, IETF Network Working Group, August 2006, section 5.2, section 6.7 1)

A network interface 203 has a function for connecting the path control device 100-1 to the communication line 120. Since the communication nodes 200 are arranged similar to the conventional communication node 1200 shown in FIG. 10, the description thereof is omitted.

FIG. 3 schematically shows an arrangement of the local database 260. The local database 260 includes a main topology information table 410 and a table before update 420. Parameters set to the respective tables will be explained later in detail.

Parameters such as "link ID", "link band", "remaining band", and the like are set to the respective entries of the main topology information table 410. Here, the entry means an information unit having a plurality of information elements. A plurality of entries which have the same format form one table. The table is managed by a database. Further, the "link ID" is used as information for uniquely identifying the entry. The "link ID" is caused to relate to *the respective links 110 of the network domain 10. The internal update unit 270 overwrites the path information calculated by the path solution unit 210 to the main topology information table 410 as a previous cache. A mark "*" of FIG. 3, which is a target of the previous cache, shows a state that the three links, that is, "link ID: a", "link ID: d", and "link ID: f" are included in the path determined by the path solution unit 210.

On the other hand, a "link ID", "link band", and "Age" are set to the respective entries of the table before update 420 shown in FIG. 3. When the internal update unit 270 executes the above previous cache to update the main topology information table 410, it stores information before update, that is, the topology information recorded to the same entries just before update to the table before update 420. Accordingly, the table before update 420 stores the topology information of the three links corresponding to the entries ("*") of the previous cache in the main topology information table 410 in FIG. 3.

FIG. 4 schematically shows an arrangement of the TE database 250 of the topology information collection unit 240. The TE database 250 holds a topology information table 430. Parameter such as "link ID", "link band", and "remaining band" are set to the respective entries of the topology information table 430 likewise the main topology information table 410 (FIG. 3) described above. The topology information collection unit 240 updates corresponding entries based on the topology information from the communication nodes 200.

The parameters of the respective table (410, 420 and 430) will be explained. The "link ID" is an identifier uniquely allocated in the network to identify the links as described above. The link band" shows all the communication bands given to the target links. The "remaining band" shows usable bands in the "link band" to which a path is not yet set. The "Age" shows a time passed after an entry is stored to the table before update 420, and the value thereof increases in a preset unit of time such as a unit of second.

Figure 5:
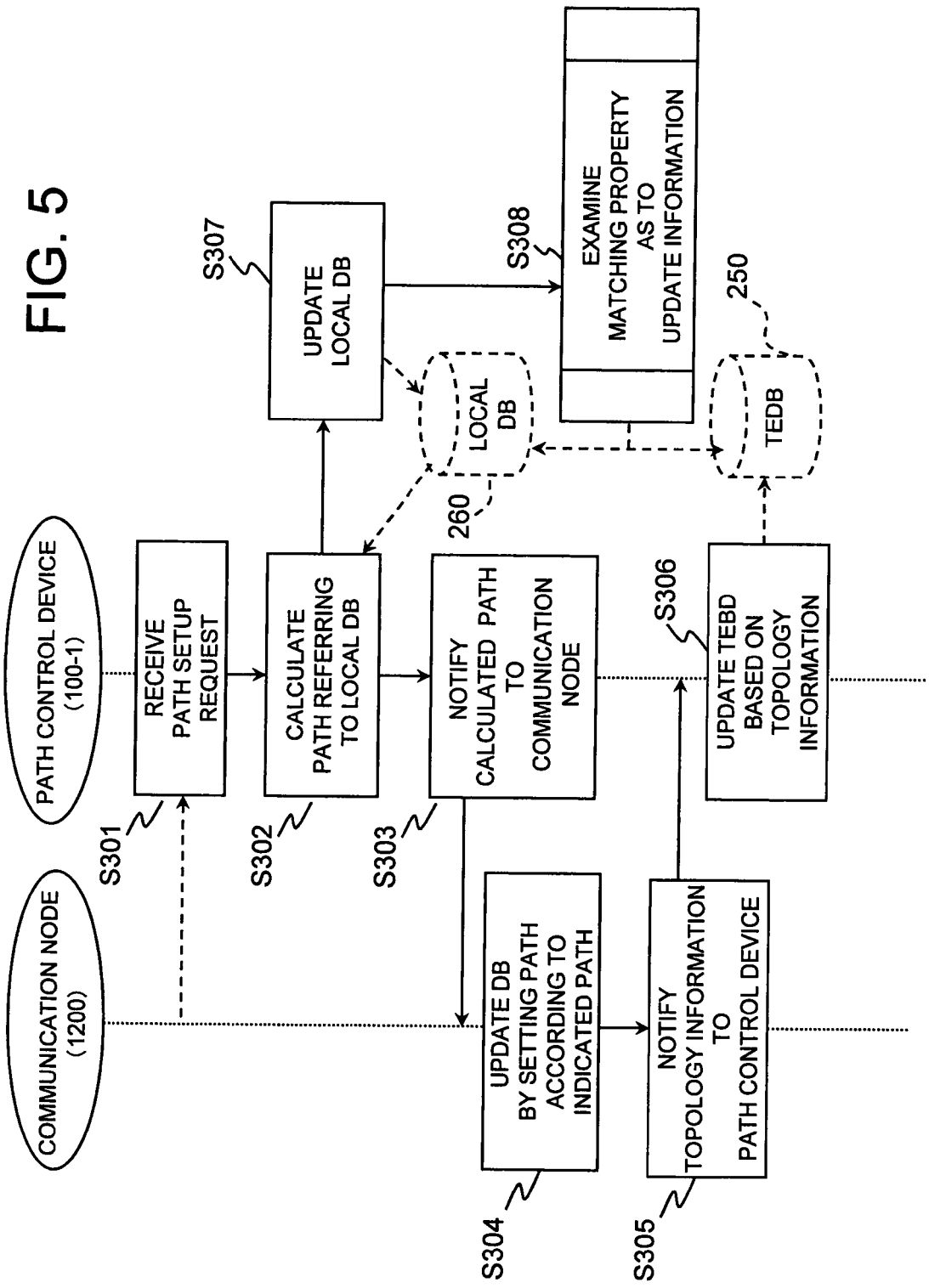
FIG. 5 is a sequence view showing an operation of the first embodiment.

An operation of the embodiment will be explained referring to FIG. 5. First, when the path response unit 220 receives a path calculation request from a communication node 1200 and the like (S301), it notifies the path solution unit 210 of the request. The path solution unit 210 calculates a path based on the restricting conditions (start point, terminating point, path band, type of path, fault recovery request, and the like) as to the notified request referring to the local database 260 (S302). The path solution unit 210 notifies a result of calculation of the path to the path solution unit 210 and the internal update unit 270. The path response unit 220 notifies the path information notified thereto to a communication node 200 of the information through the communication line (S303).

The communication node 200, which received the path information, sets a path based on the path information using a signaling protocol such as RSVP-TE and the like, and updates the database as to the information of the remaining band of a used link (S304). Then, the communication node 200 notifies the path control device 100-1 of the topology information, in which the updated contents are described, using a routing protocol such as OSPF-TE and the like (S305).

When the path control device 100-1 receives the topology information from the communication node 200, the receiving is notified to the topology information collection unit 240. The topology information collection unit 240 updates the topology information table 430 (FIG. 4) of the TE database 250 based on the topology information from the communication node 200 (S306).

On the other hand, when the internal update unit 270 is notified of the path from the path solution unit 210 (S302), it recognizes the links included in the path and the bands and the like of the respective links. Then, the internal update unit 270 updates the value, which is obtained by subtracting the communication band of the target link from the "remaining band" of the target entry in the main topology information table 410 (FIG. 3) as the previous cache. Further, the internal update unit 270 stores the information recorded to the target entry just before the value is updated to the table before update 420 once as well as starts to count the "Age". When the local database 260 is updated as described above (S307), the update determination unit 280 examines the matching property between the local database 260 and the TE database 250 by a procedure to be described later (S308).

Figure 6:
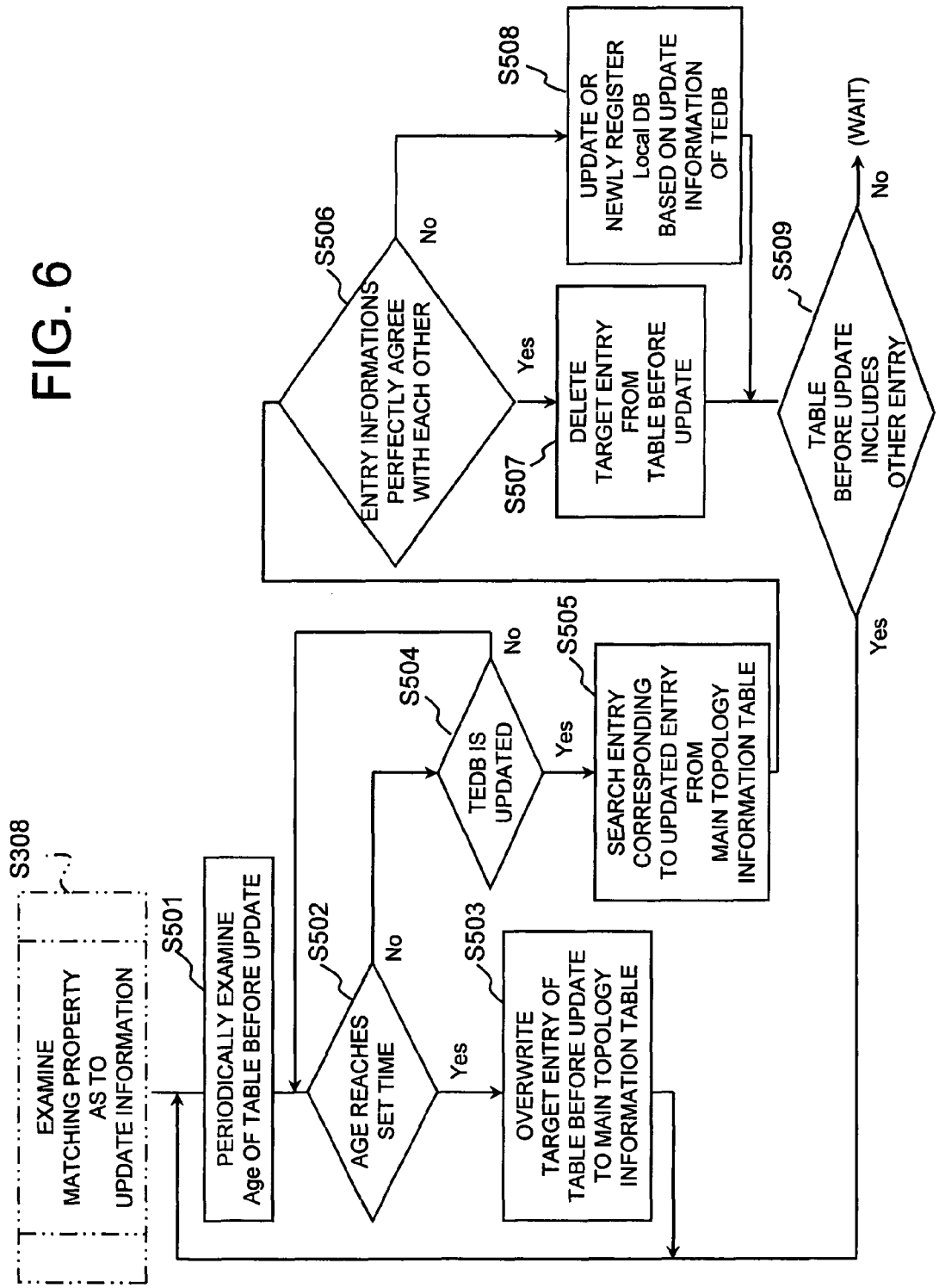
FIG. 6 is a flowchart of a procedure of examining a matching property in the first embodiment.

How the matching property is examined by the update determination unit 280 will be explained referring to FIG. 6. Each time a new entry is stored to the table before update 420, the update determination unit 280 executes the following processing to the entry.

The update determination unit 280 periodically examines whether or not the value of the "Age" of the target entry reaches a set limit time (for example, one minute (S501). In the processing, time information as the limit time of the "Age" is previously prepared to the local database 260 for each "link ID". A time, which is about ten times as long as an ideal communication time, is applied as the time information in consideration of, for example, the distance and the band form the target link 110 to the path control device 100-1. It is preferable that the ideal communication time is set in consideration of that the arrival time of a packet from the communication nodes 200 varies by congestion.

Further, when a plurality of entries are stored to the table before update 420 at the same time as in an example shown in FIG. 3, the same value is applied to the "Ages" thereof. For this purpose, for example, a maximum value of the time limits of "Age" prepared to the respective links or an average value thereof is commonly applied to the respective entries.

It means that the communication node 200 fails to set a path by any reason and the path calculated by the path control device 100-1 is not applied to the communication node 200 that the count of the "Age" reaches the time limit and is timeout.

When the update determination unit 280 detects that the "Age" is timeout (S502: Yes), it overwrites the information of the target entry in the table before update 420 to a target entry in the main topology information table 410, that is, to a corresponding entry to which the previous cache is executed (S503). With this processing, the target entry of the main topology information table 410 is returned to the state before update. Then, the update determination unit 280 deletes target entry from the table before update 420 and continues the processing to the remaining entries.

Accordingly, it is advantageous when the communication node 200 fails updating to store the information before update to the table before update 420 once without deleting it when the main topology information table 410 is updated. That is, it is possible to make the topology information similar to that of the communication nodes 200 by returning the main topology information table 410 to the state before update. With this operation, the topology information can be synchronized between the path control device 100 and the communication nodes 200.

While the "Age" of the entry does not reach the time limit (S502: No), the update determination unit 280 determines whether or not the TE database 250 is updated by the topology information from the communication nodes 200 (S504).

When the update determination unit 280 recognizes that the TE database 250 is updated, it searches the main topology information table 410 for an entry which has the same "link ID" as the "link ID" of the updated entry (S505).

When the main topology information table 410 has an entry which agrees with the updated entry of the TE database 250 as a result of the search (S506: Yes), the update determination unit 280 deletes the entry of the table before update 420 corresponding to the entry (S507). As described above, when the entry information of the same "link IDs" agree with each other between the TE database 250 and the main topology information table 410, the update determination unit 280 determines that the communication nodes 200 succeeds to update a path and deletes the previously stored information before update.

Incidentally, a path may be independently updated by the communication node 200 in addition to that it is updated using the path information from the path control device 100-1. In this case, in the path control device 100-1, a state where only, for example, the "remaining band" of the entry information of the TE database 250 is different from that of the entry of the main topology information table 410 occurs. That is, a state where the information of the corresponding entries is partly different between the tables (250 and 410) of the path control device 100-1 occurs. Further, when, for example, a new link 110 is installed to the network domain 10, a state where the entry newly created to the TE database 250 does not exist in the main topology information table 410 may occur.

When a state where information do not perfectly agree between the TE database 250 and the main topology information table 410 as described above occurs (S506: No), the update determination unit 280 determines that a path is independently updated by the communication node 200. Then, when entry information does not partly agree with each other, the main topology information table 410 is updated using the update information of the TE database 250. When a target entry does not exist in the main topology information table 410 as in the case that the link is newly installed, an entry is newly registered to the main topology information table 410 using the information of the entry (S508).

The update determination unit 280 executes the above processing as to all the entries of the table before update 420 (S509). With the above operation, even when a communication node 200 fails to set a path and even when a set path is changed on the communication node 200 side, the information of the main topology information table 410 can be caused to agree with an actual network state.

Figure 7:
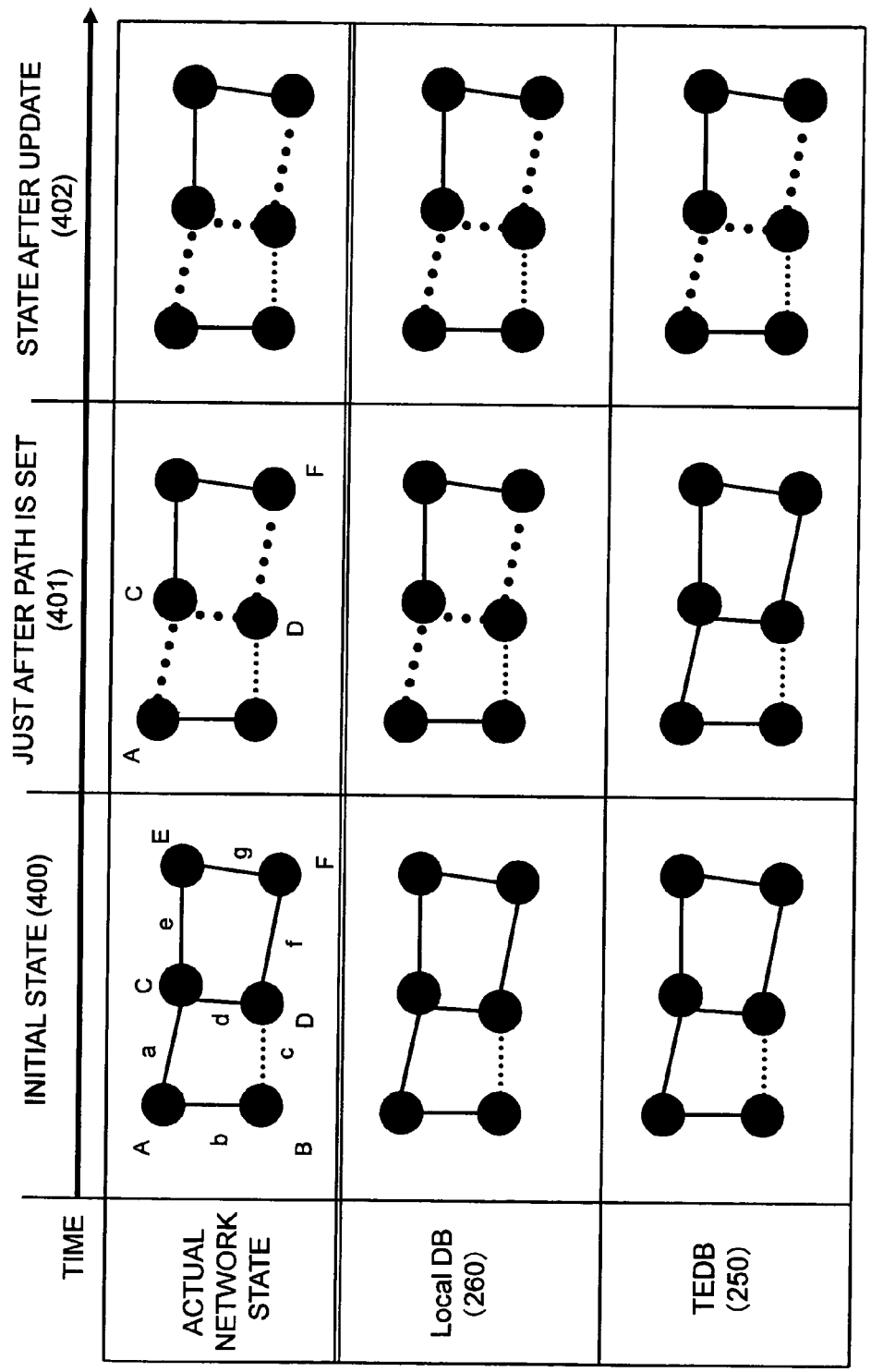
FIG. 7 is an explanatory view showing the transition of path information in the first embodiment.

Here, the states of the TE database 250 and the local database 260, which are updated as the actual network state transits, will be explained referring to FIG. 7. Illustrated communication nodes "A" to "F" and links "a" to "f" correspond to the communication nodes 200 and the links 110 of FIG. 1, respectively.

In an initial state 400 in which only the link c is used, the information of the TE database 250 and the local database 260 correspond to the actual network state. Thereafter, when the initial state 400 transits to a state 401 just after a path called a communication node A-C-D-F is newly set, the actual network state is reflected to the local database 260 by the previous cache described above. On the other hand, since the TE database 250 is not notified of update information from the communication node (200), the initial state 400 is kept in the TE database 250.

Thereafter, when the path control device 100-1 receives the update information from the communication nodes 200, the TE database 250 is updated. With this operation, the state of the TE database 250 agrees with the actual network state together with local database 260 as shown in a state after update 402 of FIG. 7.

As described above, at the time just after the path is set (401) although the actual network state is not yet reflected to the TE database 250, the path solution unit 210 calculates a path based on the local database 260 to which the actual network state is already reflected. Therefore, the path control device 100-1 can calculate a path based on a latest network state. Further, since the local database 260, to which the actual network state is reflected at once is referred to when a path is calculated, even if a path calculation is requested a plurality of times in a short time, a proper path can be calculated each time it is requested.

As described above, the path control device 100-1 includes the local database 260, which is referred to when a path is calculated, separately from the TE database 250 for managing the update state of a path in the communication nodes 200. The information of the path calculated by the path solution unit 210 is updated to the local database 260 at once as the previous cache. Further, when the information of the local database 260 does not match to the information of the TE database 250 within a predetermined period, the update determination unit 280 controls the information so that they are matched to each other.

Thus, since the embodiment is unlike to be influenced by the delay of notification of the topology information from the network, it is possible to calculate reliable path information regardless a network size.

Figure 8:
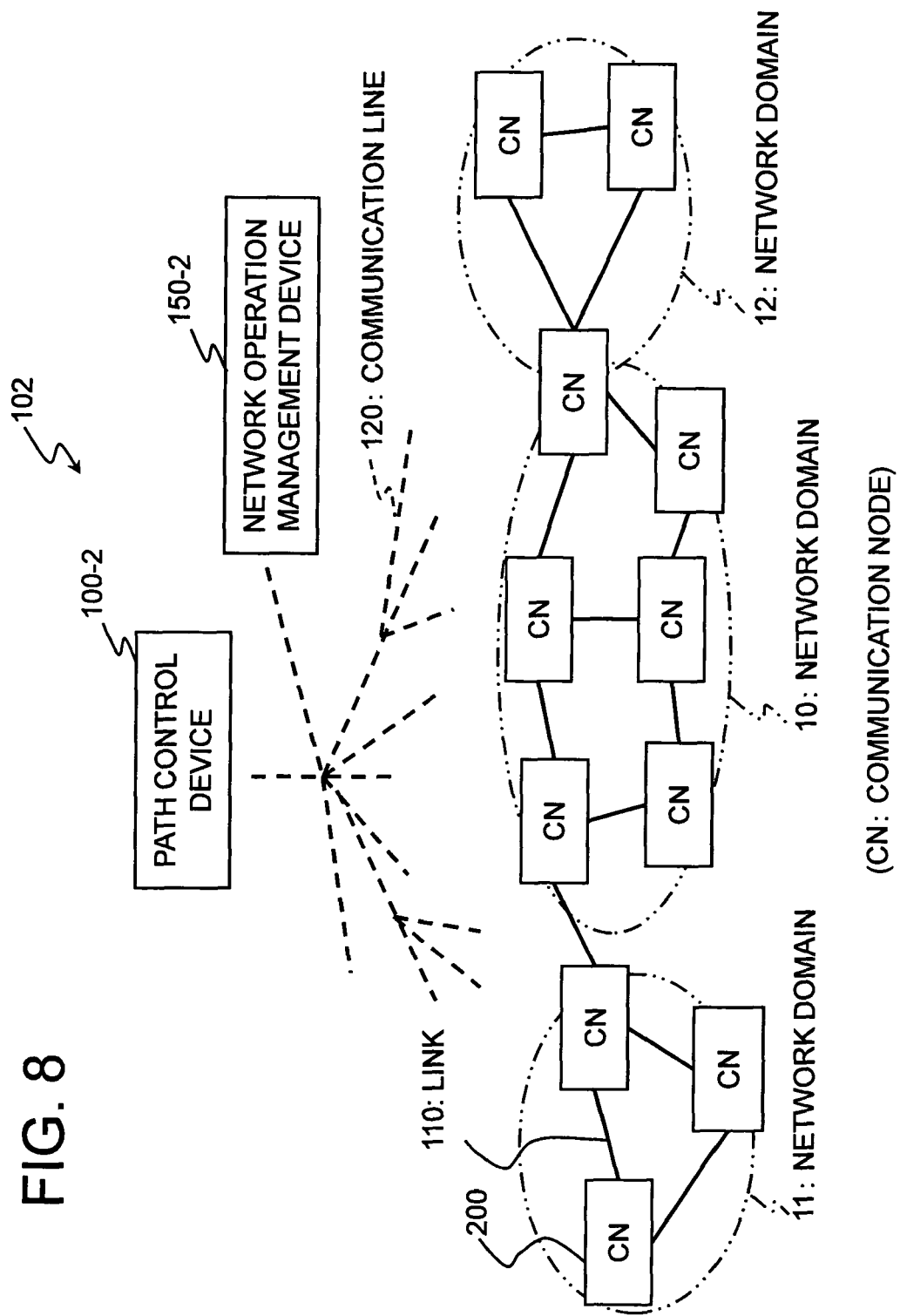
FIG. 8 is a block diagram showing an arrangement of a multi domain network according to a second embodiment of the present invention.

FIG. 8 shows a system arrangement of the second embodiment of the present invention. In a system 102, a path control device 100-2, a network operation management device 150-2 and a plurality of the network domains 10, 11 and 12 are connected to each other through a communication line 120. The system 102 of the embodiment is arranged as a multi-domain-network. The second embodiment is different from the first embodiment described above in that the single path control device 100-2 solves a path to the plurality of network domains 10, 11 and 12.

Each of the network domains (10, 11 and 12) includes a plurality of communication nodes 200 likewise the network domain 10 (FIG. 1) described above. In the respective network domains (10, 11 and 12), the communication nodes 200 transfer traffics which are connected to each other by links 110.

Figure 9:
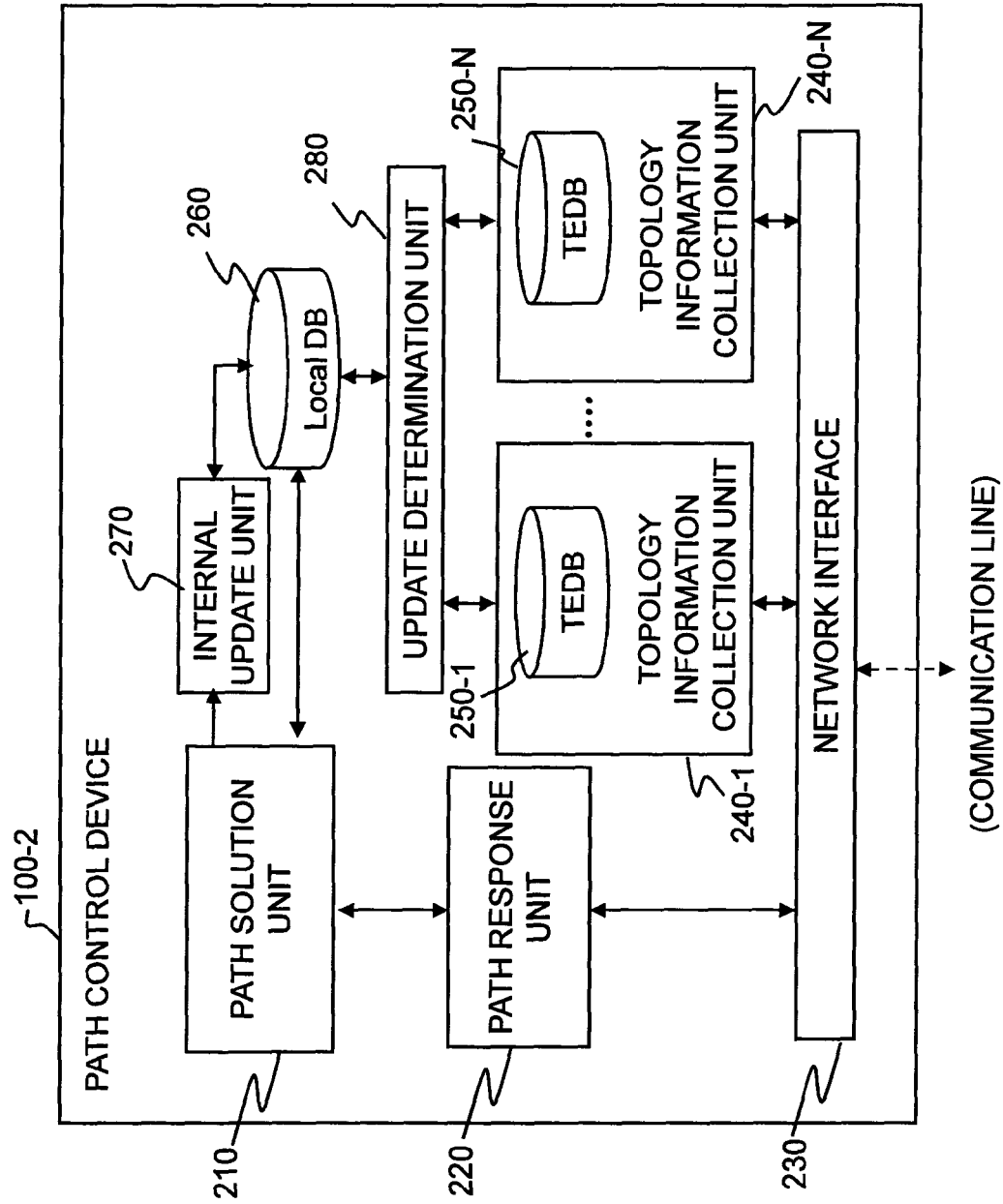
FIG. 9 is a block diagram showing an arrangement of a path control device according to the second embodiment.

FIG. 9 shows an arrangement of the path control device 100-2 of the embodiment. The arrangement of the path control device 100-2 is different from that of the path control device 100-1 described above in that the path control device 100-2 includes a plurality of topology information collection units 240-1, . . . , 240-N and TE databases 250-1, . . . , 250-N corresponding to the plurality of network domains 10, 11, 12. The other components of the path control device 100-2 are the same as those of the path control device 100-1.

The topology information collection units 240-1, . . . , 240-N collect topology information from the corresponding network domains (10, 11 and 12) and update the corresponding TE databases 250-1, . . . , 250-N. An update determination unit 280 integrates the information of the TE database 250-1, . . . , 250-N and matches the integrated information to the information of a local database 260 by comparing them with each other.

Since an operation of the second embodiment is the same as that of the first embodiment described above except that the update determination unit 280 handles the information of the plurality of TE database (250-1, . . . , 250-N), description of the operation is omitted. That is, in the path control device 100-2 of the embodiment, the update determination unit 280 integrates the topology information from the plurality of network domains (10, 11 and 12) and examines the matching property of the respective TE databases 250-1, . . . , 250-N and the local database 260.

Accordingly, the second embodiment is unlike to be affected by the delay of the update information of a network even in a large-scale network bridged to multi-domains. Therefore, the path control device 100-2 can calculate reliable path information at all times.

Note that, in the above respective embodiments, although the path control device 100 is arranged as a device different from the communication nodes 200 for the purpose of convenience, the embodiments of the present invention need not be restricted to the above arrangements. As another arrangement, the function of the path control device may be mounted on, for example, one of the communication nodes belonging to a network domain and the communication node may be used as a representative path control device.

The present invention can be applied to an application for solving a path in a large-size path switching network. Further, the present invention is preferable to various types of systems in which a delay of synchronization of database is liable to occur between a path control device (100) and communication nodes (200).

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. A network path control system comprising:
   a plurality of communication nodes connected by links of a network: and
   a path control device having a database for storing topology information showing states of use of the links in the network,
   wherein the path control device comprises:
   a path solution unit to determine a path in the network referring to the database;
   a path setting request unit to request at least one of the communication nodes to set the path according to the determined path;
   an internal update unit to recognize a link included in the determined path and to tentatively update the database with tentative topology information corresponding to the link;
   a topology information collection unit to collect topology information from at least one of the communication nodes, wherein the collected topology information is determined from the path setting at the at least one of the communication nodes; and
   an update determination unit to compare the tentative topology information with the collected topology information to verify the tentative topology information, wherein
   when the database is updated with the tentative topology information corresponding to the link, the internal update unit stores the tentative topology information corresponding to the link already stored in the database into a first table in the database, the first table including a storing period information, and
   when the storing period of the tentative topology information in the first table reaches a predetermined period and upon determination that the database is not updated with the collected topology information, the update determination unit updates the database with the link information stored in the first table.

2. A network path control system according to claim 1, wherein
   the update determination unit searches the database for tentative topology information corresponding to the collected topology information of the database, and
   when collected topology information are not detected by said search, the update determination unit updates the database with the collected topology information.

3. A network path control system according to claim 1, wherein
   the plurality of communication nodes form a plurality of domains in the network;
   an internal update unit updates the database according to each domain; and
   the update determination unit integrates the topology information of the respective domains in the database.

4. A network path control system according to claim 1, wherein the path setting request unit receives a path calculation request from the respective communication nodes.

5. A network path control system according to claim 1, wherein the topology information collection unit operates based on any one or a plurality of OSPF-TF (Open Shortest Path First with Traffic Engineering), IS-IS (Intermediate System to Intermediate System), BGP (Border Gateway Protocol), and SNMP (Simple Network Management Protocol).

6. A path control device comprising:
   a database for storing topology information showing states of use of links in a network;
   a path solution unit to determine a path in the network referring to the database;
   a path setting request unit to request at least one of the communication nodes to set the path according to the determined path;
   an internal update unit to recognize a link included in the determined path and to tentatively update the database with tentative topology information corresponding to the link;
   a topology information collection unit to collect topology information from at least one of the communication nodes, wherein the collected topology information is determined from the path setting at the at least one of the communication nodes; and
   an update determination unit to compare the tentative topology information with the collected topology information to verify the tentative topology information, wherein
   when the database is updated with the tentative topology information corresponding to the link, the internal update unit stores the tentative topology information corresponding to the link already stored in the database into a first table in the database, the first table including a storing period information, and
   when the storing period of the tentative topology information in the first table reaches a predetermined period and upon determination that the database is not updated with the collected topology information, the update determination unit updates the database with the link information stored in the first table.

7. A path control device according to claim 6, wherein
   the update determination unit searches the database for tentative topology information corresponding to the collected topology information of the database, and when collected topology information are not detected by said search, the update determination unit updates the database with the collected topology information.

8. A path control device according to claim 6, wherein
an internal update unit updates the database according to each of domains in the network with the collected topology information; and
the update determination unit integrates the topology information of the respective domains in the database.

9. A path control device according to claim 6, wherein the path setting request unit receives a path calculation request from the respective communication nodes.

10. A path control device according to claim 6, wherein the topology information collection unit operates based on any one or a plurality of OSPF-TE (Open Shortest Path First with Traffic Engineering), IS-IS (Intermediate System to Intermediate System), BGP (Border Gateway Protocol), and SNMP (Simple Network Management Protocol).

11. A non-transitory computer-readable medium encoded with instructions executed by a processor causing a computer including a database for storing topology information showing states of use of links in a network to execute processing of:
determining a path in the network referring to the database;
requesting at least one of the communication nodes to set the path according to the determined path;
recognizing a link included in the determined path;
updating tentatively the database with tentative topology information corresponding to the link; and
collecting topology information from at least one of the communication nodes, wherein the collected topology information is determined from the path setting at the at least one of the communication nodes;
comparing the tentative topology information with the collected topology information to verify the tentative topology information; wherein
when the database is updated with the tentative topology information corresponding to the link, storing the tentative topology information corresponding to the link already stored in the database into a first table in the database, the first table including a storing period information; and
when the storing period of the tentative topology information in the first table reaches a predetermined period and upon determination that the databases is not updated with the collected topology information, updating the database with the link information stored in the first table.

12. A path control method for apparatus having a database for storing topology information showing states of use of links in a network comprising steps of:
determining a path in the network referring to the database:
requesting at least one of the communication nodes to set the path according to the determined path;
recognizing a link included in the determined path:
updating tentatively the database with tentative topology information corresponding to the link;
collecting topology information from at least one of the communication nodes, wherein the collected topology information is determined from the path setting at the at least one of the communication nodes:
comparing the tentative topology information with the collected topology information to verify the tentative topology information;
before the database is updated with the tentative topology information corresponding to the link, storing the tentative topology information corresponding to the link already stored in the database into a first table in the database, the first table including a storing period information; and
updating the database with the tentative topology information stored in the first table when the storing period of the tentative topology information in the first table reaches a predetermined period and upon determination that the database is not updated with the collected topology information.

13. A path control method according to claim 12, further comprises steps of searching the database for tentative topology information corresponding to the collected topology information of the database; and updating the database with the collected topology information when said collected topology information is not detected by said search.

14. A path control method according to claim 12, further comprises steps of
updating the database according to each of domains in the network with the tentative topology information; and
integrating the topology information of the respective domains in the database.

15. A path control method according to claim 12, further comprises step of receiving a path calculation request from the respective communication nodes.

16. A path control method according to claim 12, wherein collecting the topology information of the tentative topology information of the respective communication nodes is executed based on any one or a plurality of OSPF-TE (Open Shortest Path First with Traffic Engineering), IS-IS (Intermediate System to Intermediate System), BGP (Border Gateway Protocol), and SNMP (Simple Network Management Protocol).

17. A network path control system comprising:
a plurality of communication nodes:
a path control device including a database for storing topology information,
wherein the path control device comprises:
a path solution unit to determine a communication route based on the topology information stored in the database:
a path setting request unit to request at least one of the communication nodes to set a path according to the determined route;
an update unit to tentatively update the database with tentative topology information corresponding to the determined route;
a collecting unit to collect topology information from at least one of the communication nodes, wherein the collected topology information is determined from the path setting at the at least one of the communication nodes; and
a determination unit to compare the tentative topology information with the collected topology information to verify the tentative topology information,
wherein the update unit backups the database and updates the database with the tentative topology information; and
wherein the determination unit updates the tentatively updated database with the backup information when the tentative topology information is not verified.

* * * * *